United States Patent [19]

Gotou et al.

[11] Patent Number: 4,933,834

[45] Date of Patent: Jun. 12, 1990

[54] CONTROL SYSTEM WITH IMPROVED ROBUSTNESS TO DISTURBANCES

[75] Inventors: Makoto Gotou, Nishinomiya; Eiji Ueda, Yawata, both of Japan

[73] Assignee: Matsushita Electric Industrial Co., Ltd., Osaka, Japan

[21] Appl. No.: 182,892

[22] Filed: Apr. 18, 1988

[30] Foreign Application Priority Data

| Apr. 16, 1987 | [JP] | Japan | 62-93607 |
| Apr. 22, 1987 | [JP] | Japan | 62-98912 |
| Oct. 8, 1987 | [JP] | Japan | 62-254195 |
| Oct. 8, 1987 | [JP] | Japan | 62-254200 |

[51] Int. Cl.$^5$ .................. G06F 15/00; H02P 5/00
[52] U.S. Cl. .................. 364/183; 364/167.01; 364/174; 318/616
[58] Field of Search ........... 364/183, 174, 167.01; 318/603, 615–618

[56] References Cited

U.S. PATENT DOCUMENTS

| 4,535,277 | 8/1985 | Kurakake | 318/616 |
| 4,638,421 | 1/1987 | Kimizuka et al. | 364/183 |
| 4,701,839 | 10/1987 | McNally et al. | 364/183 |
| 4,713,596 | 12/1987 | Bose | 318/616 |
| 4,755,727 | 7/1988 | Gotou | 364/167.01 |
| 4,807,153 | 2/1989 | Onaga et al. | 364/174 |
| 4,821,168 | 4/1989 | Gotou | 364/161 |

Primary Examiner—John R. Lastova
Attorney, Agent, or Firm—Wenderoth, Lind & Ponack

[57] ABSTRACT

A control system has a detecting block for obtaining a detected signal corresponding to a controlled variable of a controlled system, and a controlling block for supplying the controlled system with a control signal according to the detected signal. The controlling block includes an error signal producing block for producing an error signal from the detected signal at intervals of a detecting period of time, a memorizing block for storing a plurality of memorized values corresponding to the error signal, and a control signal producing block for producing the control signal by mixing the error signal with one or more of the memorized values. The memorizing block renews the memorized values sequentially and periodically at intervals of a renewing cycle period of time proportional to the detecting period, each with a mixed value computed from the error signal and one or more of the memorized values having been renewed at intervals of L renewing cycle periods, where L is an integer at least equal to 2. The controlling block also includes an operation selecting block for selecting a control operation, and a position detecting block for detecting a physical movement of the controlled system. The position detecting block obtains a stored position of the memorized value corresponding to a physical position of the controlled system so as to utilize the memorized values promptly and correctly when the operation selecting block selects the control operation using the memorizing block.

8 Claims, 8 Drawing Sheets

CONTROL SYSTEM WITH IMPROVED ROBUSTNESS TO DISTURBANCES

BACKGROUND OF THE INVENTION

1. Field of the Invention

This invention relates to a control system, and more particularly, to a control system which is required to have a good robustness to disturbances, such as a control system for a motor.

2. Description of the Prior Art

In conventional control systems, a PI controller (Proportional-Integral controller) has been widely used in order to improve the robustness to disturbances, or to suppress influences of disturbances. Recently, the PI controller can provide a digital control using a microprocessor. For example, a digital PI controller using a microprocessor for controlling the speed of a DC motor is disclosed in "Digital Control Systems", chapter 14, section 14.4, pp 689–694, written by Benjamin C. Kou and published as Holt-Saunders International Editions.

The PI controller, whether analog or digital, can improve the robustness to disturbances more at a lower frequency. However, the recent requirement to improve the robustness to disturbances has become more and more severe in some applications. For example, a control system for controlling the speed of a capstan motor in a video tape recorder requires a highly improved robustness to torque disturbances, because the size and the inertia of the capstan motor have been greatly minimized in recent years.

We have developed new control systems for improving robustness to disturbances, which are disclosed in my previous U.S. patent application, Ser. No. 917,498 filed October 10, 1986 (now U.S. Pat. No. 4,821,168) and Ser. No. 22,872 filed March 6, 1987 (now U.S. Pat. No. 4,755,729). Each of these improved control systems has an excellent robustness to disturbances by using some RAM (random access memory) devices. However, there remains a problem in that each of these improved control systems requires a long period of time to reach a steady state of the improved robustness to disturbances from the starting timing of the control operation.

SUMMARY OF THE INVENTION

It is an object of the present invention to provide a control system which is improved so as to reach a steady state of an improved robustness to disturbances more promptly.

It is another object of the present invention to provide a control system for a motor which is improved so as to reach a steady state of an improved robustness to torque disturbances more promptly.

These objects are achieved according to the present invention by providing a control system comprising:

a control system for controlling a brushless motor comprising:

position sensing means for producing multiphase position sensor signals indicative of a rotational position of the brushless motor;

sensing means for producing a sensed signal having a frequency indicative of a rotational speed of the the brushless motor, and wherein said frequency of said sensed signal is substantially higher than a frequency of the position sensor signals;

speed detecting means for producing a detected signal of a digital number representative of the rotational speed of the brushless motor at intervals of a detecting cycle period proportional to a period of the sensed signal;

error signal producing means for producing an error signal when the detected signal indicates that the rotational speed of the brushless motor deviates from a target rotational speed by more than a specified amount;

a memory having stored therein a plurality of memorized values at a plurality of sequential storing positions corresponding to a plurality of sequential rotational positions of the brushless motor;

cyclic up-down counter means for counting pulses of at least one of the multiphase position sensor signals according to a rotating direction of the brushless motor, wherein a count value is obtained corresponding to a rotational position of the brushless motor;

initial position detection means for detecting a timing at which the count value of said counter means changes after an absolute value of the error signal becomes less than a predetermined value, and for detecting from the count value at the thus detected timing a storing position in said memory corresponding to a rotational position of the brushless motor;

storing means for renewing, sequentially and periodically at intervals of a renewing cycle period proportional to the detecting cycle period of the speed detecting means, each of the plurality of memorized values in said memory by a first mixed value which is obtained by a means for mixing the error signal with at least one of the memorized values which are at least an interval of L renewing cycle periods older, where L is an integer at least equal to 2 and the interval L renewing cycle periods is equal to the rotational period of the brushelss motor, wherein said storing means determines a storing position from which the renewing is to be started from the storing position detected by said initial position detecting means;

control signal producing means for producing a control signal from a second mixed value which is obtained by a means for mixing the error signal with at least one of the memorized values; and driving means responsive to the control signal for providing to the brushless motor multiphase currents proportional to the control signal.

BRIEF DESCRIPTION OF THE DRAWINGS

These and other objects, features, and advantages of the present invention will become more apparent from the following detailed description taken with the accompanying drawings in which.

DESCRIPTION OF THE PREFERRED EMBODIMENTS

Figure 1:
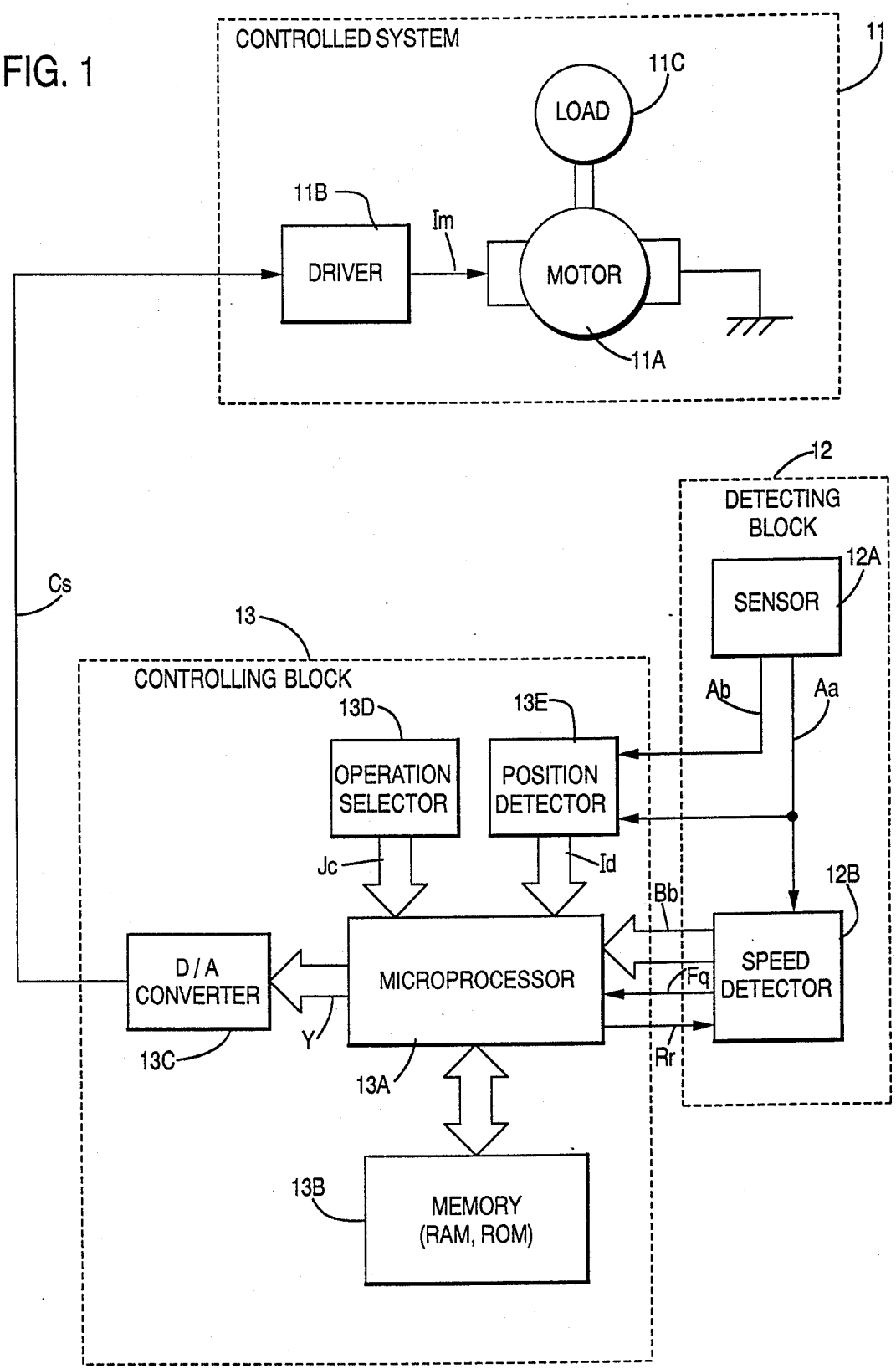
FIG. 1 is a basic block diagram of a control system for controlling the speed of a motor.

Referring now to FIG. 1, which shows a schematic construction of an embodiment of the present invention, a controlled system 11 has a DC motor 11A to be controlled and a driver 11B supplying the DC motor 11A with a current Im (a power). The DC motor 11A is controlled so as to rotate a load 11C (a torque disturbance source) at a target speed.

A detecting block 12 has a sensor 12A and a speed detector 12B. The sensor 12A produces two sensed signals Aa and Ab, each of which has a frequency equal to Pa times the rotational frequency fm [Hz] of the DC motor 11A, where Pa is an integer at least equal to 2. In this case, Pa is equal to 512. The sensor 12A is arranged so that the signals Aa and Ab are out of phase from each other by 90 degrees. The sensed signal Aa follows the sensed signal Ab when the DC 11A rotates clockwise, and the sensed signal Aa proceeds the sensed signal Ab when the DC motor 11A rotates counterclockwise. The speed detector 12B generates a detected signal Bb and a flag signal Fq at every one or half period (detecting period) of the sensed signal Aa. The detected signal Bb is a digital or coded signal with a digital number showing the one or half period of the sensed signal Aa, that is, the speed of the DC motor 11A. The flag signal Fq is set to be "H" (a high voltage) at every timing when the speed detector 12B generates a new detected code or value. The detail construction and operation of the space detector 12B will be described later with reference to FIG. 2.

A controlling block 13 has a microprocessor 13A, a memory 13B including RAM (random access memory) and ROM (read only memory), a D/A converter 13C, an operation selector 13D, and a position detector 13E. The microprocessor 13A selects and executes control operations according to a select signal Jc produced by the operation selector 13D. The select signal Jc is a digital or coded signal which selects operations of the microprocessor 13A. The microprocessor 13A mainly receives the detected signal Bb and supplies the driver 11B of the controlled system 11 with a control signal Cs according to the detected signal Bb. The position detector 13E detects a physical movement of the DC motor 11A according to the sensed signals Aa and Ab, and produces a position signal Id which is a digital or coded signal having a digital number representing a the rotational position of the DC motor 11A. The detail operations of the microprocessor 13A and the position detector 13E will be described later with reference to FIG. 3.

The drive 11B supplies the DC motor 11A with the current Im corresponding to the control signal Cs so as to generate a generated torque proportional to the control signal Cs.

Thus, a control loop (a speed control loop of the DC motor 11A) can be formed by the controlled system 11 (the DC motor 11A and the driver 11B), the detecting block 12 (the sensor 12A and the speed detector 12B) and the controlling block 13 (the microprocessor 13A, the memory 13B and the D/A converter 13C), so that the controlled variable of the controlled system 11 (the speed of the DC motor 11A) is controlled at a target value (a target speed).

Figure 2:
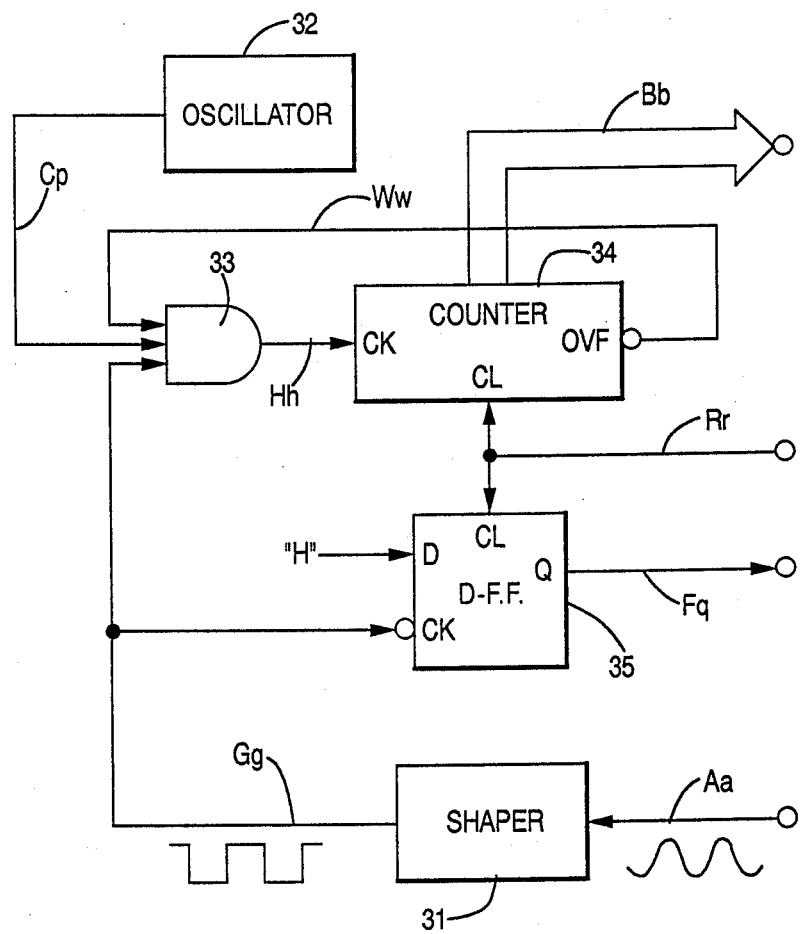
FIG. 2 is a circuit diagram of a speed detector usable in the control system shown in FIG. 1.

A construction of the speed detector 12B shown in FIG. 2 will be explained in detail hereinbelow. A shaper 31 compares the sensed signal Aa with a predetermined voltage and produces a shaped signal Gg having a squared waveform. The shaped signal Gg is applied to an input terminal of an AND circuit 33 and a trigger input terminal CK of a D-type flip-flop 35. A clock pulse signal Cp produced by an oscillator 32 and an overflow signal Ww of a counter 34 are respectively applied to the other input terminals of the AND circuit 33. The oscillator 32 has a crystal oscillator and a frequency divisor, for example, and it produces the clock pulse signal Cp with a frequency of about 1 MHz, much higher than the frequency of the shaped signal Gg. The counter 34 has a 12 bit length and it counts up the output pulse Hh of the AND circuit 33. The overflow signal Ww of the counter 34 is "H" when the content of the counter 34 remains below a predetermined value, and turns "L" when the content of the counter 34 becomes equal to or over the predetermined value, where "H" and "L" denote a high voltage (5 V) and a low voltage (0 V), respectively. As the data input terminal of the D-type flip-flop 35 is connected to "H", the flag signal Fq, the output signal of the D-type flip-flop 35, becomes "H" at every timing of the falling edges of the shaped signal Gg. A reset signal Rr from the controlling block 13 can reset the contents of the counter 34 and the D-type flip-flop 35 to be Bb="LLLL LLLL LLLL" and Fq="L".

The operation of the speed detector 12B shown in FIG. 2 will be explained hereinbelow. Assume that the contents of the counter 34 and the D-type flip-flop 35 are reset, or are at their initial conditions, and that the shaped signal Gg is "L". After the shaped signal Gg changes from "L" to "H", the counter 34 counts up the output pulse Hh of the AND circuit 33 which is the clock pulse signal Cp from the oscillator 32. At the time when the shaped signal Gg changes from "H" to "L", the output signal Hh of the AND circuit 33 becomes "L" and the counter 34 holds the content until the next change of the shaped signal Gg. The held content of the counter 34 is the digital or coded number proportional to the half period of the sensed signal Aa, which is inversely proportional to the speed of the DC motor 11A. The flag signal Fq changes from "L" to "H" at a falling edge of the shaped signal Gg. The controlling block 13 receives the detected signal Bb, the held content of the counter 34, after checking that the flag signal Fq is "H". Then, the controlling block 13 resets the contents of the counter 34 and the D-type flip-flop 35 by making the reset signal Rr "H" for a short time. The counter 34 and the D-type flip-flop 35 return to their initial conditions to prepare for the next detection. The held content of the counter 34 can be a large value, when the speed of the DC motor 11A is very low during the starting or accelerating time.

Figure 3:
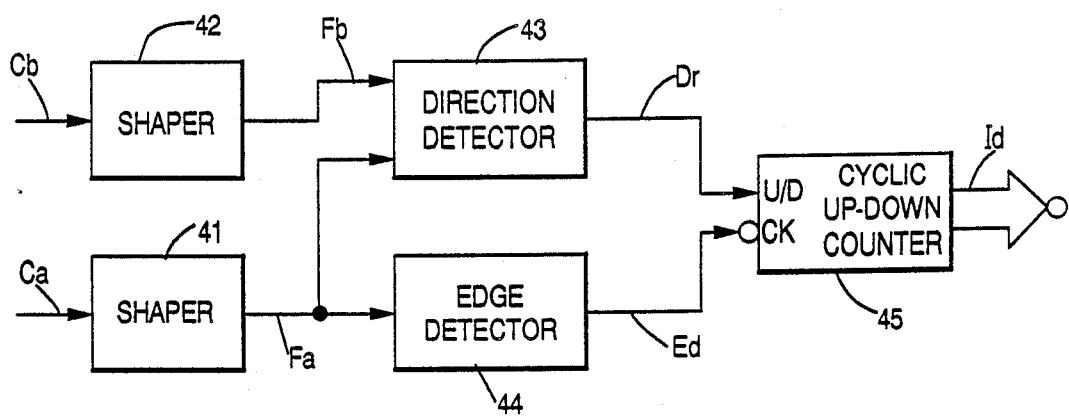
FIG. 3 is a circuit diagram of a position detector usable in the control system shown in FIG. 1.
Figure 4:
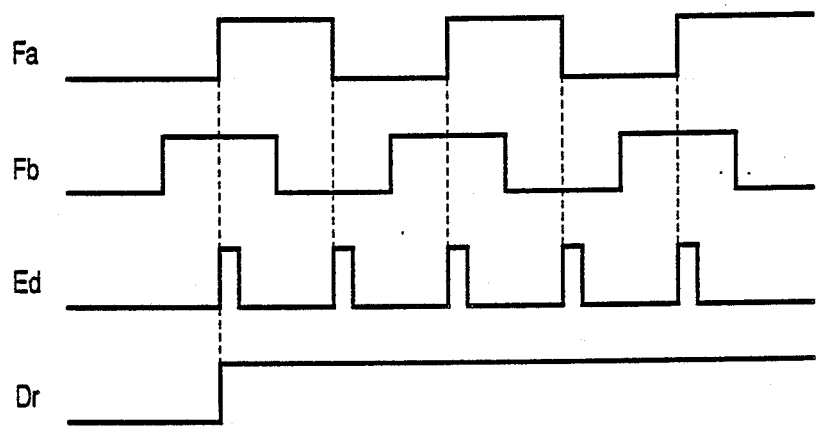
FIG. 4 shows waveforms of signals for explaining the operation of the position detector shown in FIG. 3.

A construction of the position detector 13E shown in FIG. 3 will be explained in detail hereinbelow with further reference to the waveform diagram shown in FIG. 4. The sensed signals Aa and Ab from the sensor 12A are applied to shapers 41 and 42 as input signals Ca and Cb, respectively. That is, Ca=Aa and Cb=Ab. The shaper 41 compares the sensed signal Aa with a predetermined voltage and produces a shaped signal Fa having a squared waveform. The shaper 42 compares the sensed signal Ab with another predetermined voltage and produces another shaped signal Fb having a squared waveform. Due to the phase difference between the sensed signals Aa and Ab, the shaped signals Fa and Fb also have a phase difference of 90 degrees (¼ period of the signal Fa) therebetween. That is, the shaped signal Fa follows the shaped signal Fb when the DC motor 11A rotates clockwise, and the shaped signal Fa proceeds the shaped signal Fb when the DC motor 11A rotates counterclockwise. FIG. 4 shows waveforms of the signals when the DC motor 11A rotates clockwise.

An edge detector 44 produces a pulse signal Ed from the shaped signal Fa. Each of the pulses of the pulse signal Ed occurs at each of the timings of the rising and falling edges of the shaped signal Fa. Each pulse of the pulse signal Ed has a predetermined short width.

A direction detector 43 receives as inputs the shaped signals Fa and Fb and produces a direction signal Dr which indicates the rotational direction of the DC motor 11A. The direction detector 43 detects the direction of the DC motor 11A by checking the voltage ("L" or "H") of the shaped signal Fb at the timings of the rising and falling edges of the shaped signal Fa. In the case where the shaped signal Fb is "H" at the timing of the rising edge of the shaped signal Fa and "L" at the timing of the falling edge of the shaped signal Fa, the direction detector 43 generates the direction signal Dr "H". In the case where the shaped signal Fb is "L" at the timing of the rising edge of the shaped signal Fa and "H" at the timing of the falling edge of the shaped signal Fa, the direction detector 43 generates the direction signal Dr "L". Thus, the direction signal Dr is "H" when the DC motor 11A rotates clockwise, and "L" when the DC motor 11A rotates counterclockwise.

A cyclic up-down counter 45 produces the position signal Id from the direction signal Dr and the pulse signal Ed. The cyclic up-down counter 45 counts up the pulses of the pulse signal Ed when the direction signal Dr is "H", and counts down the pulses of the pulse signal Ed when the direction signal Dr is "L". The cyclic up-down counter 45 counts cyclicly, or endlessly, when the DC motor 11A rotates continuously. Since the cyclic up-down counter 45 is triggered at every falling edge of the pulse signal Ed and the direction detector 43 produces new direction signal Dr at every rising edge of the pulse signal Ed, the content of the cyclic up-down counter 45 always corresponds to the rotational position of the DC motor 11A even though the DC motor 11A changes the rotational direction. Since the cycle of the cyclic up-down counter 45 is 2Pa (Pa is the detecting cycles/revolution of the speed detector 12B), the content of the cyclic up-down counter 45, except for the LSB, is outputted as the position signal Id. In this case, the cyclic up-down counter 45 is a 10 bit up-down counter which has 1024 states, and the position signal Id is the upper 9 bits of the 10 bit up-down counter, except for the LSB. Thus, the position signal Id indicates 512 positions per one revolution of the DC motor 11A.

Figure 5:
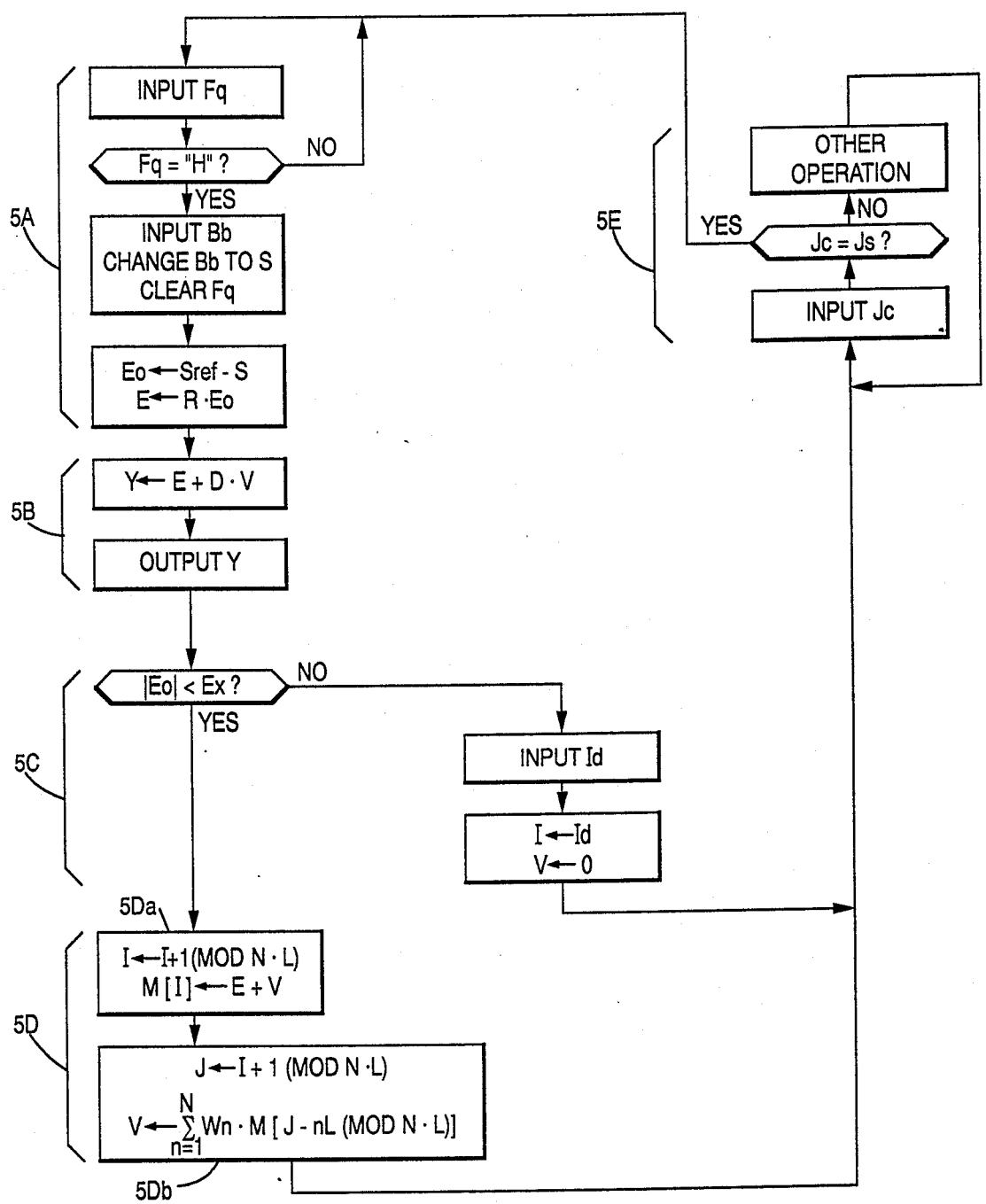
FIG. 5 is a flow diagram of the operation of the microprocessor which represents an embodiment of a control system according to the present invention with the combination of FIG. 1, FIG. 2, FIG. 3, and FIG. 5.

The operation of the microprocessor 13A will be explained in detail hereinbelow, referring to FIG. 5 which shows a flow diagram of the operation of the microprocessor 13A. It is noted that a register name in the RAM of the memory 13B and a content stored therein are designated by a same lable hereinbelow. The microprocessor 13A executes the following tasks according to instructions stored in the ROM of the memory 13B:

AN ERROR SIGNAL PRODUCING BLOCK 5A (5A-1) The flag signal Fq is checked until it becomes "H". That is, the microprocessor 13A is triggered so as to execute the following procedure at the timing when the speed detector 12B generates a new detected code corresponding to the current speed of the DC motor 11A.

(5A-2) The detected signal Bb, the held content of the counter 34, is received and changed to a digital or coded value S. Then, the contents of the counter 34 and the D-type flip-flop 35 are reset by generates the reset signal Rr "H" for a very short time.

(5A-3) A difference value Eo is computed between the detected value S and a predetermined value Sref corresponding to the target speed. That is, $Eo = Sref - S$. Then, an error signal E is obtained by multiplying the difference value Eo with a predetermined positive value R. That is, $E = REo$. New values of the error signal E are detected at intervals of the detecting period which is equal to the period of the sensed signal Aa.

A CONTROL SIGNAL PRODUCING BLOCK 5B (5B-1) An output signal Y is obtained by mixing the error signal E with a composite value V which is produced in a composing block 5Db in a memorizing block 5D, described later, at a ratio of 1:D, where D is a positive real at most equal to 1.5 and at least equal to 0.25.

(5B-2) The output signal Y is outputted to the D/A converter 13C as the control signal Cs.

AN INITIAL POSITION DETECTING BLOCK 5C (5C-1) The absolute value of the difference value, $|Eo|$, is compared with a predetermined positive value Ex. When $|Eo| < Ex$, which means that the speed of the DC motor 11A is substantially equal to the target speed, the operation of the microprocessor 13A goes to the memorizing block 5D so that the control operation using the memorizing block 5D is executed. When $|Eo| > Ex$, or $|Eo| = Ex$ which means that the speed of the DC motor 11A is far from the target speed, the operation of the microprocessor 13A goes to (5C-2).

(5C-2) The position signal Id from the position detector 13E is inputted and stored in a register. The value of the position signal Id is also denoted as Id.

(5C-3) A count variable I is replaced by Id, and the composite value V is replaced by 0. That is, $I = Id$ and $V = 0$. Then, the operation of the microprocessor 13A goes to an operation selecting block 5E.

A MEMORIZING BLOCK 5D

The memorizing block 5D comprises a renewing block 5Da and the composing block 5Db.

<A RENEWING BLOCK 5Da>

(5Da-1) The count variable I is incremented with a modulo number NL, where L is an integer equal to Pa or an integral multiple of Pa (preferably L=Pa) and N is a positive integer including 1. That is, '$I=I+1$ (MOD NL)' means '$I=I+1$ and I=0 if I=NL', because A with a modulo B means the remainder of A/B. Thus, the count variable I varies from 0 to NL−1 and increments the number in a circular form at every detecting timing of the speed detector 12B. In this case, L=Pa=512.

(5Da-2) A memorized value M[I], stored at an address (a stored position) corresponding to the count variable I in the RAM of the memory 13B, is renewed by a mixed value of the error signal E and the composite value V at a ratio of 1:1. That is, $M[I]=E+V$. The renewed memorized value M[I] is held until the next renewing time of M[I], that is, the NL renewing cycle periods later. As the result of this, the NL memorized values M[O] to M[NL−1] are obtained, and the NL memorized values are sequentially and periodically renewed at intervals of the renewing cycle period equal to the detecting period of the speed detector 12B.

<THE COMPOSING BLOCK 5Db>

(5Db-1) An operation of '$J=I+1$ (MOD NL)' is executed to obtain an integer J proceeding the count variable I by 1.

(5Db-2) The composite value V of the composing block 5Db is computed by combining linearly a set of N memorized values M[J−nL (MOD NL)] (n=1, ... ,N) with positive coefficients Wn (n=1, ... ,N) from n=1 to n=N, where the N memorized values M[J−nL (MOD NL)] (n=1, ... ,N) have been renewed at intervals of L renewing cycle periods. That is, $$V = \sum_{n=1}^{N} Wn \, M[J - nL \, (MOD \, NL)] \quad (1)$$

where $$0 < Wn < 2/N \; (n=1,\ldots,N) \quad (2)$$

$$\sum_{n=1}^{N} Wn = 1 \quad (3)$$

Preferably, $$Wn = 1/N \; (n=1,\ldots,N) \quad (4)$$

so as to facilitate the computation of the composite value V. Notice that the set of N memorized values here for computing the composite value V can be only one memorized value, which is substituted as the composite value V. Notice also that the composite value V of Eq. (1), computed here, will be used in the control signal producing block 5B and the renewing block 5Da at the next detected timing. So, the composing block 5Db computes the composite value V for future use, and the count variable I at the next detected timing will be equal to J at this timing.

AN OPERATION SELECTING BLOCK 5E (5E-1) The select signal Jc from the operation selector 13D is inputted and stored in a register. The value of the select signal Jc is also denoted as Jc.

(5E-2) Jc is compared with a predetermined value Js. When Jc=Js, which means that the control operation using the error signal producing block 5A, the control signal producing block 5B, the initial position detecting block 5C, and the memorizing block 5D is selected for controlling the speed of the DC motor 11A, the operation of the microprocessor 13A goes back to the error signal producing block 5A. When Jc>Js or Jc<Js, which means that another control operation not using the memorizing block 5D is selected, the operation of the microprocessor 13A goes to (5E-3).

(5E-3) The microprocessor 13A executes an operation corresponding to the select signal Jc. Then, the operation of the microprocessor 13A goes back to (5E-1) for reselecting the operation.

The control system of the embodiment of the present invention, shown by the combination of FIG. 1, FIG. 2, FIG. 3, and FIG. 5, has an excellent robustness to disturbances when the microprocessor 13A executes the control operation using the error signal producing block 5A, the control signal producing block 5B, and the memorizing block 5D, as explained in the previous U.S. patent application, Ser. No. 917,498 filed October 18, 1986.

Further, the control system of the embodiment of the present invention has a quick response in reaching a steady state of the excellent robustness to disturbances by providing the position detector 13E and the initial position detectiong block 5C, which is explained in detail hereinbelow. In the case of the control system for controlling a capstan motor in a video cassette recorder, for example, there are many control operations not using the memorizing block 5D, such as a cue operation, a review operation, a forward slow operation, a reverse slow operation, or a stop operation. The DC motor 11A may be rotated in these control operations. The position detector 13E always detects the physical movement (the rotation) of the DC motor 11A and obtains the position signal Id, the value of which always corresponds to the physical position (the rotational position) of the DC motor 11A. When the selecting signal Jc is changed to Js, the DC motor 11A begins to rotate and accelerate the speed to the target speed. Since the absolute value of the difference value |Eo| is larger than Ex during the starting or accelerating time, the initial position detecting block 5C substitutes the count variable I with the position signal Id from the position detector 13E. The count variable I indicates the address (the stored position) of the memorized value M[I] in the memorizing block 5D. Since the length of the L renewing cycle periods is equal to the one revolution period or an integral multiple of the one revolution period of the DC motor 11A, the stored position of the memorized value corresponding to the rotational position of the DC motor 11A is obtained promptly and correctly as soon as the absolute value of the difference value |Eo| becomes smaller than Ex.

It is found that the DC motor 11A and the load 11C produces torque disturbances having a period of time equal to the one revolution period of the DC motor 11A and that the torque disturbances generated by the DC motor 11A and the load 11C are dominant in the torque disturbances which disturb the speed of the DC motor 11A. That is, the dominant torque disturbances generated by the DC motor 11A and the load 11C are thought to be synchronized by the rotation of the DC motor 11A. It is also found that the memorizing block 5D holds, as the memorized values M[I] (I=0,1, ... ,N−1), the values corresponding to the dominant torque disturbances once the control operation using the memorizing block 5D is executed.

Since the control system of the present invention has the position detector 13E and the initial position detecting block 5C, the memorizing block 5D can produce promptly and correctly the composite value V in the composing block 5Db by using the memorized value corresponding to the rotational position of the DC motor 11A. The composite value V is used in the control signal producing block 5B so as to suppress the influence of the dominant torque disturbances generated by the DC motor 11A and the load 11C. Thus, the control system of the embodiment of the present invention as described with reference to the combination of FIG. 1, FIG. 2, FIG. 3, and FIG. 5 has a quick response in reaching a steady state of the excellent robustness to disturbances once the control operation using the memorizing block 5D is executed.

Figure 6:
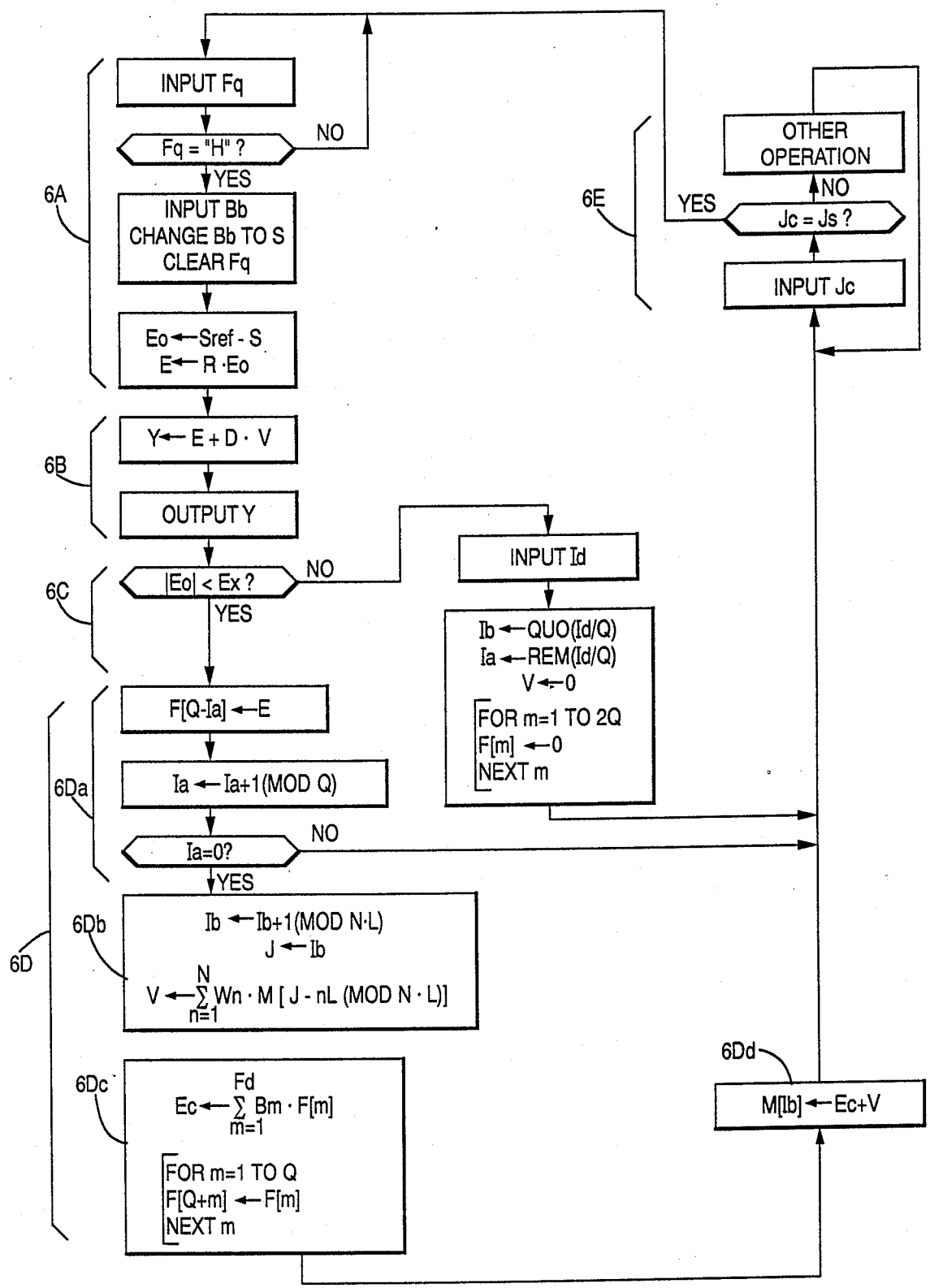
FIG. 6 is another flow diagram of the operation of the microprocessor which represents an embodiment of a control system according to the present invention with the combination of FIG. 1, FIG. 2, FIG. 3, and FIG. 6.

FIG. 6 shows another flow diagram of the operation of the microprocessor 13A in the controlling block 13, which represents another embodiment of the present invention as described with reference to the combination of FIG. 1, FIG. 2, FIG. 3, and FIG. 6. The flow diagram of FIG. 6 will be explained hereinbelow.

AN ERROR SIGNAL PRODUCING BLOCK 6A (6A-l) The flag signal Fq is checked until it becomes "H". That is, the microprocessor 13A is triggered so as to execute the following procedure at the timing when the speed detector 12B generates a new detected code corresponding to the current speed of the DC motor 11A.

(6A-2) The detected signal Bb, the held content of the counter 34, is inputted and changed to a digital or coded value S. Then, the contents of the counter 34 and the D-type flip-flop 35 are reset by generating the reset signal Rr "H" for a very short time.

(6A-3) A difference value Eo is computed between the detected value S and a predetermined value Sref corresponding to a target speed. That is, $Eo = Sref - S$. Then, an error signal E is obtained by multiplying the difference value Eo with a predetermined positive value R. That is, $E = REo$. New values of the error signal E are detected at intervals of the detecting period which is equal to the period of the sensed signal Aa.

A CONTROL SIGNAL PRODUCING BLOCK 6B (6B-1) An output signal Y is obtained by mixing the error signal E with a composite value V which is produced in a composing block 6Db in a memorizing block 6D, described later, at a ratio of 1:D, where D is a positive real at most equal to 1.5 and at least equal to 0.25.

(6B-2) The output signal Y is outputted to the D/A converter 13C as the control signal Cs.

AN INITIAL POSITION DETECTING BLOCK 6C (6C-1) The absolute value of the difference value, $|Eo|$, is compared with a predetermined positive value Ex. When $|Eo| < Ex$, which means that the speed of the DC motor 11A is substantially equal to the target speed, the operation of the microprocessor 13A goes to the memorizing block 6D so that a control operation using the memorizing block 6D is executed. When $|Eo| > Ex$ or $|Eo| = Ex$, which means that the speed of the DC motor 11A is far from the target speed, the operation of the microprocessor 13A goes to (6C-2).

(6C-2) The position signal Id of the position detector 13E is inputted and stored in a register. The value of the position signal Id is also denoted as Id.

(6C-3) An operation of 'Ib=QUO(Id/Q)' is executed so that a second count variable Ib is replaced by the quotient of (Id/Q), where Q is an integer at least equal to 2 and preferably a divisor of Pa. In this case, Q=4. Another operation of 'Ia=REM(Id/Q)' is executed so that a first count variable Ia is replaced by the remainder of (Id/Q). The composite value V is replaced by 0. The values of registers F[m] (m=1,2, ... ,2Q) are replaced by 0. Then, the operation of the microprocessor 13A goes to an operation selecting block 6E.

A MEMORIZING BLOCK 6D

The memorizing block 6D comprises a selecting task block 6Da, the composing block 6Db, a filtered error signal producing block 6Dc and a renewing block 6Dd.

<A SELECTING TASK BLOCK 6Da>

(6Da-1) The error signal E at this timing is stored in a register F[Q−Ia]. That is, $F[Q-Ia] = E$.

(6Da-2) The first count variable Ia is incremented with a modulo number Q. That is, 'Ia=Ia+1 (MOD Q)' means 'Ia=Ia+1 and Ia=0 if Ia=Q'. Thus, the first count variable Ia varies form 0 to Q-1 and increments the number is a circular form at every detecting timing of the speed detector 12B.

(6Da-3) The first count variable Ia is compared with 0. When Ia=0, the operation of the microprocessor 13A goes to the composing block 6Db so as to execute the composing block 6Db, the filtered error signal producing block 6Dc, and the renewing block 6Dd. When Ia>0 or Ia<0, that is, Ia is from 1 to Q-1, the operation of the microprocessor 13A goes to the operation selecting block 6E.

<COMPOSING BLOCK 6Db>

(6Db-1) The second count variable Ib is incremented with a modulo number NL, where L is an integer at least equal to 2 and substantially equal to Pa/Q or an integral multiple of Pa/Q (preferably L=Pa/Q) and N is an positive integer including 1. That is, 'Ib=Ib+1 (MOD NL)' means 'Ib=Ib+1 and Ib=0 if Ib=NL'. Thus, the second count variable Ib varies from 0 to NL−1 and increments the number in a circular form at every Q detecting timings of the speed detector 12B. In this case L=Pa/Q=128.

(6Db-2) Another integer J is replaced by Ib. That is, J=Ib.

(6Db-3) The composite value V is computed by combining linearly a set of N memorized values M[J−nL (MOD NL)] (n=1, ... ,N) with positive coefficients Wn (n=1, ... ,N) from n=1 to n=N, where the N memorized values M[J=nL (MOD NL)] (n=1, ... ,N) have been renewed at intervals of L renewing cycle periods. That is, the composite value V is computed by Eqs. (1), (2), (3), and (4).

<A FILTERED ERROR SIGNAL PRODUCING BLOCK 6Dc>

(6Dc-1) A filtered error signal Ec is computed by combining linearly a plurality of vlaues F[m] (m=1,2, .

..., Fd) which are values of the error signal E sequentially with respect to the timings obtained, where Fd is a positive integer at least equal to 2 and at most equal to 2Q. That is, $$Ec = \sum_{m=1}^{Fd} Bm \, F[m] \quad (5)$$

where the coefficients Bm are positive and have the following relationships:

$$Bm = B_{Fd-m} \, (m = 1,2, \ldots, Fd/2) \quad (6)$$

$$\sum_{m=1}^{Fd} Bm = 1 \quad (7)$$

After the computation of the filtered error signal Ec, the values F[m] (m=1,2,....Q) are transferred to the registers F[Q+m] (m=1,2,...,Q), respectively. Notice that the values F[m] (m=1,2,...,2Q) at the computing timing of the filtered signal Ec are those of the error signal E sequentially with respect to the timings obtained. Notice also that the filtered error signal producing block 6Dc with the relationships of Eq. (5) to Eq. (7) has a low-pass digital filter characteristics which has a gain substantially equal to 1 at a lower frequency region and a reduced gain much smaller than 1 at a higher frequency region.

<A RENEWING BLOCK 6Dd>

(6Dd-1) A memorized value M[Ib], stored at the address (the stored position) corresponding to the second count variable Ib in the RAM of the memory 13B, is renewed by a mixed value of the filtered error signal Ec and the composite value V at a ratio of 1:1. That is, $M[Ib]=Ec+V$. The renewed memorized value M[Ib] is held until the next renewing time of M[Ib], that is, the NL renewing cycles later. As the result of this, the NL memorized values M[O] to M[NL−1] are obtained, and the NL memorized values are sequentially and periodically renewed at intervals of the renewing cycle period equal to Q times the detecting period. After the execution of the task of the renewing block 6Dd, the operation of the microprocessor 13A goes to the operation selecting block 6E.

AN OPERATION SELECTING BLOCK 6E (6E-1) The select signal Jc from the operation selector 13D is inputted and stored in a register. The value of the select signal Jc is also denoted as Jc.

(6E-2) Jc is compared with a predetermined value Js. When Jc=Js, which means that the control operation using the error signal producing block 6A, the control signal producing block 6B, the initial position detecting block 6C, and the memorizing block 6D is selected for controlling the speed of the DC motor 11A, the operation of the microprocessor 13A goes back to the error signal producing block 6A. When Jc>Js or Jc<Js, which means that another control operation not using the memorizing block 6D is selected, the operation of the microprocessor 13A goes to (6E-3).

(6E-3) The microprocessor 13A executes an operation corresponding to the selecting signal Jc. Then, the operation of the microprocessor 13A returns to (6E-1) for reselecting the operation.

The control system of the embodiment of the present invention shown by the combination of FIG. 1, FIG. 2, FIG. 3, and FIG. 6 uses comparably a small amount of RAM and has an excellent robustness to disturbances when the microprocessor 13A executes the control operation using the error signal producing block 6A, the control signal producing block 6B, and the memorizing block 6D, as explained in the previous U.S. application, Ser. No. 22,872 filed March 6, 1987.

Further, the control system of the embodiment of the present invention as described in reference the combination of FIG. 1, FIG. 2, FIG. 3, and FIG. 6 has a quick response in reaching a steady state of the excellent robustness to disturbances by providing the position detector 13E and the initial position detecting block 6C. The reason for this is the same as that of the embodiment as described in reference to the combination of FIG. 1, FIG. 2, FIG. 3, and FIG. 5, except that the number L is equal to Pa/A or an integral multiple of Pa/Q.

Figure 7:
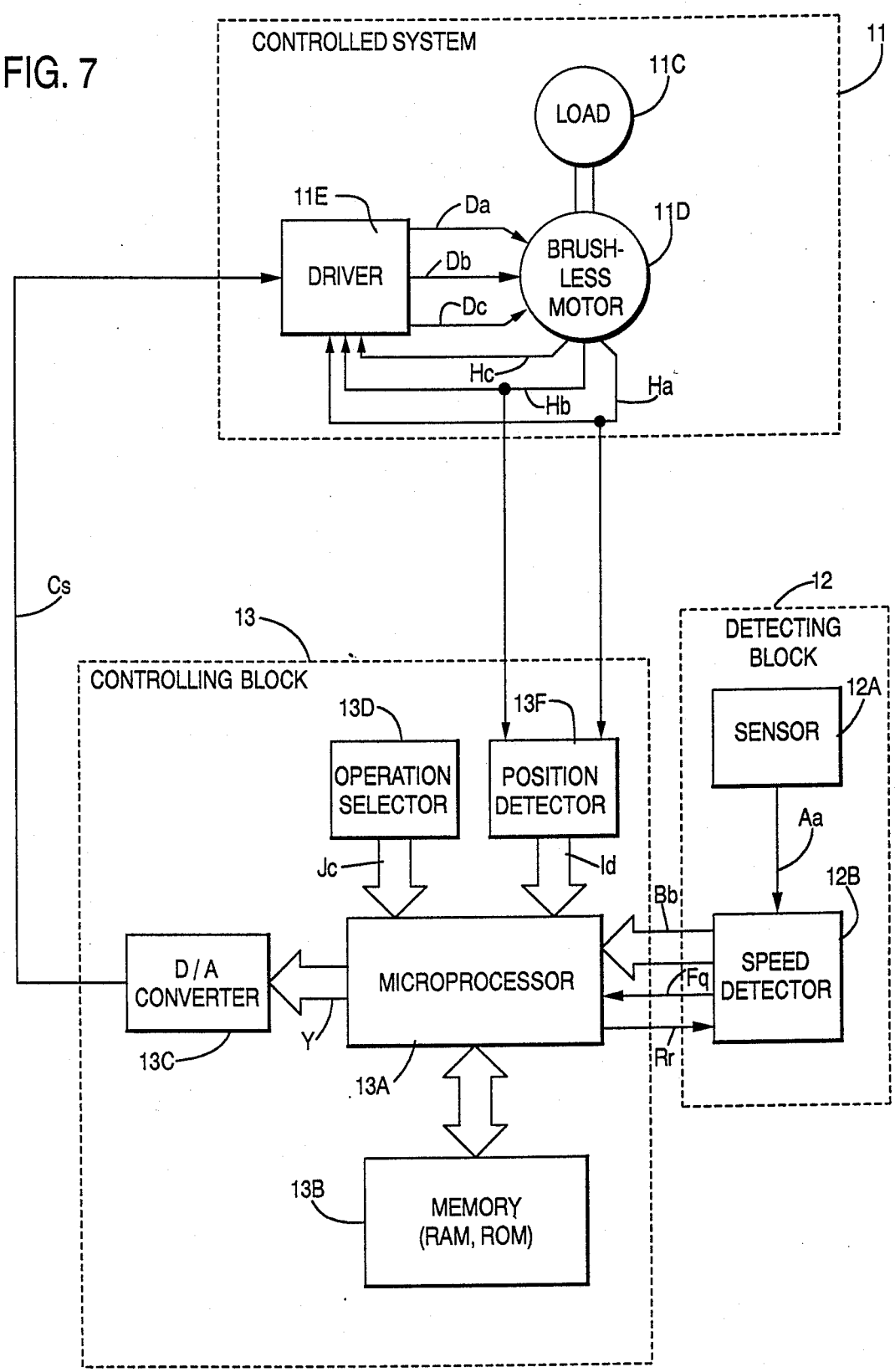
FIG. 7 is another basic block diagram of a control system for controlling the speed of a motor.

FIG. 7 shows another schematic construction of an embodiment of the present invention. This construction is the same as that shown in FIG. 1 except for a brushless motor 11D, a driver 11E, and a position detector 13F. The same parts as those in FIG. 1 are denoted by the same reference numerals.

The controlled system 11 has the brushless motor 11D to be controlled and the driver 11E supplying the brushless motor 11D with three phase currents Da, Db, and Dc. The brushless motor 11D is controlled so as to rotate the load 11C (a torque disturbance source) at a target speed.

The brushless motor 11D has position sensors which produces three phase position sensor signals Ha, Hb, and Hc corresponding to the rotation of the brushless motor 11D. The driver 11E distributes the three phase currents Da, Db, and Dc according to the three phase position sensor signals Ha, Hb, and Hc. The magnitudes of the currents Da, Db, and Dc are proportional to the control signal Cs so as to generate a generated torque proportional to the control signal Cs. A winding voltage balancing circuit for a brushless DC motor, shown in U.S. Pat. No. 4,494,053, is usable as the driver 11E for driving the brushless motor 11D.

The position sensor signals Ha, Hb, and Hc have a frequency equal to Rg times the rotational frequency fm [Hz] of the brushless motor 11D, where Rg is an integer including 1 and much less than Pa. Rg is related to the number of the magnetic poles of the brushless motor 11D. In this case, Rg is equal to 4. The position sensors of the brushless motor 11D are arranged so that the position sensor signals Ha, Hb, and Hc are out of phase from each other by 120 degrees. The position sensor signal Ha follows the position sensor signal Hb when the brushless motor 11D rotates clockwise, and proceeds the position sensor signal Hb when the brushless motor 11D rotates counterclockwise.

The detecting block 12 has the sensor 12A and the speed detector 12B. The sensor 12A produces the sensed signal Aa which has a frequency equal to Pa times the rotational frequency fm [Hz] of the brushless motor 11D, where Pa is an integer at least equal to 2 and preferably equal to an integral multiple of Rg. In this case, Pa is equal to 512 which is 128 times Rg. The speed detector 12B generates the detected signal Bb and the flag signal Fq at every one or half period (detecting period) of the sensed signal Aa. The detected signal Bb is a digital or coded signal with a digital number corresponding to the one half period of the sensed signal Aa, that is, the speed of the brushless motor 11D. The flag signal Fq is set to be "H" (a high voltage) at every timing when the speed detector 12B obtains a new detected code or value. The detail construction of the speed detector 12B is the same as that shown in FIG. 2.

The controlling block 13 has the microprocessor 13A, the memory 13B including RAM and ROM, and D/A converter 13C, the operation selector 13D, and the position detector 13F. The microprocessor 13A selects and executes control operations according to the select signal Jc from the operation selector 13D. The microprocessor 13A mainly receives the detected signal Bb and supplies the driver 11E of the controlled system 11 with the control signal Cs according to the detected signal Bb. The position detector 13F detects the physical movement (the rotation) of the brushless motor 11D by using the position sensor signals Ha and Hb, and it produces a position signal Id which is a digital or coded signal with a digital number corresponding to the physical position (the rotational position) of the brushless motor 11D. The detail operation of the microprocessor 13A and the position detector 13F will be described later.

Thus, a control loop (a speed control loop of the brushless motor 11D) can be formed by the controlled system 11 (the brushless motor 11D and the driver 11E), the detecting block 12 (the sensor 12A and the speed detector 12B) and the controlling block 13 (the microprocessor 13A, the memory 13B and the D/A converter 13C), so that the controlled variable of the controlled system 11 (the speed of the brushless motor 11D) is controlled at the target value (the target speed).

The construction of the position detector shown in FIG. 3 can be used as the position detector 13F, which will explained in detail hereinbelow. The position sensor signals Ha and Hb are applied to the shapers 41 and 42 as the input signals Ca and Cb, respectively. That is, Ca=Ha and Cb=Hb. The shaper 41 compares the position sensor signal Ha with a predetermined voltage and produces the shaped signal Fa. The shaper 42 compares the position sensor signal Hb with a predetermined voltage and produces the shaped signal Fb. Since the position sensor signals Ha and Hb are out of phase by 120 degrees ($\frac{1}{3}$ period of the position sensor signal Ha), the shaped signals Fa and Fb are also out of phase difference by 120 degrees. That is, the shaped signal Fa follows the shaped signal Fb when the brushless motor 11D rotates clockwise, and proceeds the shaped signal Fb when the brushless motor 11D rotates counterclockwise.

The edge detector 44 produces the pulse signal Ed from the shaped signal Fa. Each of the pulses of the pulse signal Ed occurs at each of the timings of the rising and falling edges of the shaped signal Fa. Each pulse of the pulse signal Ed has a predetermined short width.

The direction detector 43 inputs the shaped signals Fa and Fb and produces the direction signal Dr which indicates the rotational direction of the brushless motor 11D. The direction signal Dr is "H" when the brushless motor 11D rotates clockwise, and "L" when the brushless motor 11D rotates counterclockwise.

The cyclic up-down counter 45 produces the position signal Id from the direction signal Dr and the pulse signal Ed. The cyclic up-down counter 45 counts up the pulses of the pulse signal Ed when the direction signal Dr is "H", and counts down the pulses of the pulse signal Ed when the direction signal Dr is "L". The content of the cyclic up-down counter 45 always corresponds to the rotational position of the brushless motor 11D. Since the cycle of the cyclic up-down counter 45 is 2Rg, (Rg is the cycles/revolution of the position sensor signal Ha), the content of the cyclic up-down counter 45, except for the LSB, is outputted as the position signal Id of the position detector 13F. In this case, the cyclic up-down counter 45 is a 3 bit up-down counter which has 8 states, and the position signal Id is the upper 2 bits of the 3 bit up-down counter 45. Thus, the position signal Id indicates 4 positions per one revolution of the brushless motor 11D.

Figure 8:
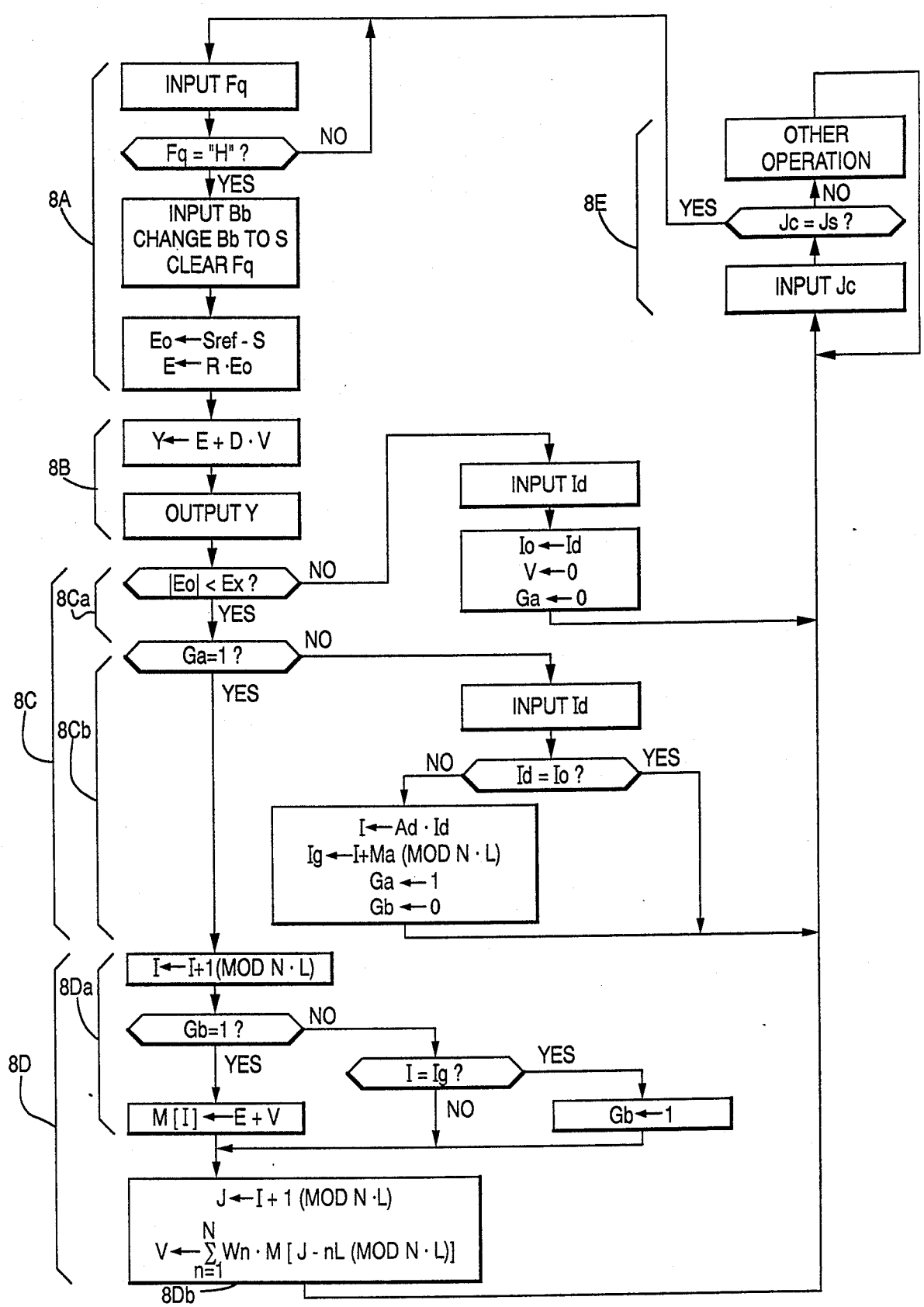
FIG. 8 is another flow diagram of the operation of the microprocessor which represents an embodiment of a control system according to the present invention with the combination of FIG. 7, FIG. 2, FIG. 3, and FIG. 8.

FIG. 8 shows another flow diagram of the operation of the microprocessor 13A in the controlling block 13, which represents another embodiment of the present invention as represented by the combination of FIG. 7, FIG. 2, FIG. 3, and FIG. 8. The flow diagram of FIG. 8 will be explained hereinbelow.

AN ERROR SIGNAL PRODUCING BLOCK 8A (8A-1) The flag signal Fq is checked until it becomes "H". That is, the microprocessor 13A is triggered so as to execute the following procedure at the timing when the speed detector 12B obtains a new detected code corresponding to the current speed of the brushless motor 11D.

(8A-2) The detected signal Bb, the held content of the counter 34, is inputted and changed to the digital or coded value S. Then, the contents of the counter 34 and the D-type flip-flop 35 are reset by generating the reset signal Rr "H" for a very short time.

(8A-3) A difference value Eo is computed between the detected value S and a predetermined value Sref corresponding to the target speed. That is, Eo=Sref-S. Then, an error signal E is obtained by multiplying the difference value Eo with a predetermined positive value R. That is, E=REo. New values of the error signal E are detected at intervals of the detecting period equal to the period of the sensed signal Aa.

A CONTROL SIGNAL PRODUCING BLOCK 8B (8B-1) An output signal Y is obtained by mixing the error signal E with a composite value V produced in a composing block 8Db in a memorizing block 8D, described later, at a ratio of 1: D, where D is a positive real at most equal to 1.5 and at least equal to 0.25.

(8B-2) The output signal Y is outputted to the D/A converter 13C as the control signal Cs.

AN INITIAL POSITION DETECTING BLOCK 8C

The initial position detecting block 8C comprises an error checking block 8Ca and an initial position setting block 8Cb.

<AN ERROR CHECKING BLOCK 8Ca>

(8Ca-1) The absolute value of the difference value, |Eo|, is compared with a predetermined positive value Ex. When |Eo|<Ex, which means that the speed of the brushless motor 11D is substantially equal to the target speed, the operation of the microprocessor 13A goes to the initial position setting block 8Cb so as to obtain the stored position of the memorized value corresponding to the rotatinal position of the brushless motor 11D before the control operation using the memorizing block 8D is executed. When |Eo|>Ex or |Eo|=Ex, which means that the speed of the brushless motor 11D is far from the target speed, the operation of the microprocessor 13A goes to (8Ca-2).

(8Ca-2) The position signal Id from the position detector 13F is inputted and stored in a register. The value of the position signal Id is also denoted as Id.

(8Ca-3) A variable Io is replaced by Id, the composite value V is replaced by 0, and a variable Ga is replaced by 0. That is, Io=Id, V=0, and Ga=0. Then, the operation of the microprocessor 13A goes to an operation selecting block 8E.

<AN INITIAL POSITION SETTING BLOCK 8Cb>

(8Cb-1) The variable Ga is compared with 1. When Ga=1, the operation of the microprocessor 13A goes to the memorizing block 8D. When Ga<1 or Ga>1, the operation of the microprocessor 13A goes to (8Cb-2).

(8Cb-2) The position signal Id from the position detector 13F is inputted and compared with the variable Io. When Id=Io, which means that the present value Id of the position signal is the same as the old value Io, the operation of the microprocessor 13A goes to the operation selecting block 8E. When Id>Io or Id<Io, which means the present value Id of the position signal is changed from the old value Io, the operation of the microprocessor 13A goes to (8Cb-3).

(8Cb-3) A count variable I is replaced by AdId (I=AdId), where Ad is a positive integer substantially equal to Pa/Rg. In this case, Ad=Pa/Rg=128. A variable Ig is replaced by 'I+Ma (MOD NL)', where N and where L will be explained later and Ma is an integer at least equal to 2. The variable Ig proceeds the count variable I by Ma. The variable Ga is replaced by 1 (Ga=1), and a variable Gb is replaced by 0 (Gb=0). Then, the operation of the microprocessor 13A goes to the operation selecting block 8E.

A MEMORIZING BLOCK 8D

The memorizing block 8D comprises a renewing block 8Da and the composing block 8Db.

<A RENEWING BLOCK 8Da>

(8Da-1) The count variable I is incremented with a modulo number NL, where L is an integer equal to Pa or an integral multiple of Pa (preferably L=Pa) and N is a positive integer including 1. That is, 'I=I+1 (MOD NL)' means 'I=I+1 and I=O if I=NL'. Thus, the count variable I varies from 0 to NL−1 and increments the number in a circular form at every detecting timing of the speed detector 12B. In this case, L=Pa=512.

(8Da-2) The variable Gb is compared with 1. When Gb=1, the operation of the microprocessor 13A goes to (8Da-3) so as to renew the memorized value stored at the address corresponding to the count variable I. When Gb<1 or Gb>1, the count variable I is compared with Ig. When I=Ig, the variable Gb is replaced by 1 (Gb=1). Then, the operation of the microprocessor 13A goes to the composing block 8Db. When I<Ig or I>Ig, the operation of the microprocessor 13A goes to the composing block 8Db. Notice that none of the memorized value is renewed when I<Ig and I=Ig.

(8Da-3) A memorized value M[I], stored at the address (the stored position) corresponding to the count variable I in the RAM of the memory 13B, is renewed by a mixed value of the error signal E and the composite value V at a ratio of 1:1. That is, M[I]=E+V. The renewed memorized value M[I] is held until the next renewing time of M[I], that is, the NL renewing cycle periods later. As the result of this, the NL memorized values M[0] to M[NL−1] are obtained, and the NL memorized values are sequentially and periodically renewed at intervals of the renewing cycle period equal to the detecting period of of the speed detector 12B.

<THE COMPOSING BLOCK 8Db>

(8Db-1) An operation of 'J=I+1 (MOD NL)' is executed to obtain an integer J proceeding the count variable I by 1.

(8Db-2) The composite value V of the composing block 8Db is computed by combining linearly a set of N memorized values M[J-nL (MOD NL)] (N=1,...,N) with positive coefficients Wn (n=1,...,N) from n=1 to n=N, where the N memorized values M[J-nL (MOD NL)] (n=1,...,N) have been renewed at intervals of L renewing cycle periods. That is, the composite value V is computed by the Eqs. (1), (2), (3), and (4).

AN OPERATION SELECTING BLOCK 8E (8E-1) The select signal Jc from the operation selector 13D is inputted and stored in a register. The value of the select signal Jc is also denoted as Jc.

(8E-2) Jc is compared with a predetermined value Js. When Jc=Js, which means that the control operation using the error signal producing block 8A, the control signal producing block 8B, the initial position detecting block 8C, and the memorizing block 8D is selected for controlling the speed of the brushless motor 11D, the operation of the microprocessor 13A returns to the error signal producing block 8A. When Jc>Js or Jc<Js, which means that another control operation not using the memorizing block 8D is selected, the operation of the microprocessor 13A goes to (8E-3).

(8E-3) The microprocessor 13A executes an operation corresponding to the select signal Jc. Then, the operation of the microprocessor 13A returns to (8E-1) for reselecting the operation.

The control system of the embodiment of the present invention, shown by the combination of FIG. 7, FIG. 2, FIG. 3, and FIG. 8, has an excellent robustness to disturbances when the microprocessor 13A executes the control operation using the error signal producing block 8A, the control signal producing block 8B, and the memorizing block 8D, as explained in the previous U.S. patent application, Ser. No. 917,498 filed October 18, 1986.

Further, the control system of the embodiment of the present invention has a quick response in reaching a steady state of the excellent robustness to disturbances by providing the position detector 13F and the initial position detecting block 8C, which is explained in detail hereinbelow. The position detector 13F always detects the physical movement (the rotation) of the brushless motor 11D and obtains the position signal Id, the value of which always corresponds to the physical position (the rotational position) of the brushless motor 11D. When the select signal Jc is changed to Js, the brushless motor 11D begins to rotate and accelerate the speed to the target speed. Since the absolute value of the difference value |Eo| is larger than Ex during the starting or accelerating time, the error checking block 8Ca in the initial position detecting block 8C substitutes the variable Io with the position signal Id from the position detector 13F. When |Eo| becomes smaller than Ex, the initial position setting block 8Cb in the initial position detecting block 8C finds a rotational position where the position signal Id from the position detector 13F changes by comparing the position signal Id with the variable Io, and it replaces the count variable I with AdId corresponding to the new position signal Id. The count variable I indicates the address (the stored position) of the memorized value M[I] in the memorizing block 8D. Since the length of the L renewing cycle periods is equal to the one revolution period or an integral multiple of the one revolution period of the brushless motor 11D, the stored position of the memorized value corresponding to the rotational position of the brushless motor 11D is obtained promptly and correctly as soon as |Eo| becomes smaller than Ex.

The memorizing block 8D can produce promptly and correctly the composite value V in the composing block 8Db by using the memorized value corresponding to the rotational position of the brushless motor 11D. The composite value V is used in the control signal producing block 8B to suppress the influence of the dominant torque disturbances generated by the brushless motor 11D and the load 11C. Thus, the control system of the embodiment of the present invention as represented by the combination of FIG. 7, FIG. 2, FIG. 3, and FIG. 8 has a quick response in reaching a steady state of the excellent robustness to disturbances once the control operation using the memorizing block 8D is executed.

Notice that since the count variable I is initially set with a value corresponding to the rotational position of the brushless motor 11D by identifying the timing at which the position signal Id (the content of the cyclic up-down counter 45) changes, the initial position setting block 8Cb can set the correct or accurate value of the count variable I which corresponds to the rotational position of the brushless motor 11D, though the position detecting cycles/revolution of the position detector 13F, Rg, is much less than the speed detecting cycles/revolution of the speed detector 12B, Pa.

The response of the control system of the embodiment of the present invention as represented by the combination of FIG. 7, FIG. 2, FIG. 3, and FIG. 8 is further improved by using the composite value V corresponding to the memorized values before the renewing block 8Ca begins to renew the memorized values, which is explained in detail hereinbelow. The initial position setting block 8Cb obtains the variable Ig proceeding the count variable I by Ma when |Eo| becomes smaller than Ex. The composing block 8Db produce the composite value V from the memorized values, while the renewing block 8Da does not renew the memorized values and holds them until the count variable I becomes to proceed Ig by 1. Since the composite value V is used for producing the control signal Cs in the control signal producing block 8B, the fluctuation of the speed of the brushless motor 11D is reduced by the composite value V. Thus, the error signal E is already reduced before the renewing block 8Da begins to renew the memorized values. As the result of this, the control system of the embodiment of the present invention as represented by the combination of FIG. 7, FIG. 2, FIG. 3, and FIG. 8 reaches a steady state as soon as the renewing block 8Da begins to renew the memorized values.

For comparing the responses, consider the control system that begins to renew the memorized values as soon as |Eo| becomes smaller than Ex, such as the control system of the embodiment of the present invention as represented by the combination of FIG. 1, FIG. 2, FIG. 3, and FIG. 5. The error signal E is comparably large a short time after |Eo| becomes smaller than Ex, because of the following reasons. The first reason is that Ex is large enough to cover the fluctuation of |Eo| in a steady state. The second reason is that a short response time is necessary for reducing the error signal E by using the composite value V corresponding to the memorized values. Since the memorized value stored at the address corresponding to the count variable I is renewed by a mixed value of the error signal E and one or more of the memorized values, the memorized values renewed in the short time after |Eo| becomes smaller than Ex have comparably large values, which are held until the next renewing timings, about L renewing cycle periods later. The composing block 8Db produces a comparably large composite value V by using the comparably large memorized values at the L renewing cycle periods later. Since the control signal Cs contains the comparably large composite value V, the speed of the brushless motor 11D is disturbed by the comparably large composite value V, and the error signal E becomes somewhat large. In this manner, the influence of the large error signal E in the short time after |Eo| becomes smaller than Ex remains in the memorized values for a considerably long time, if the memorized values are renewed as soon as |Eo| becomes smaller than Ex.

Figure 9:
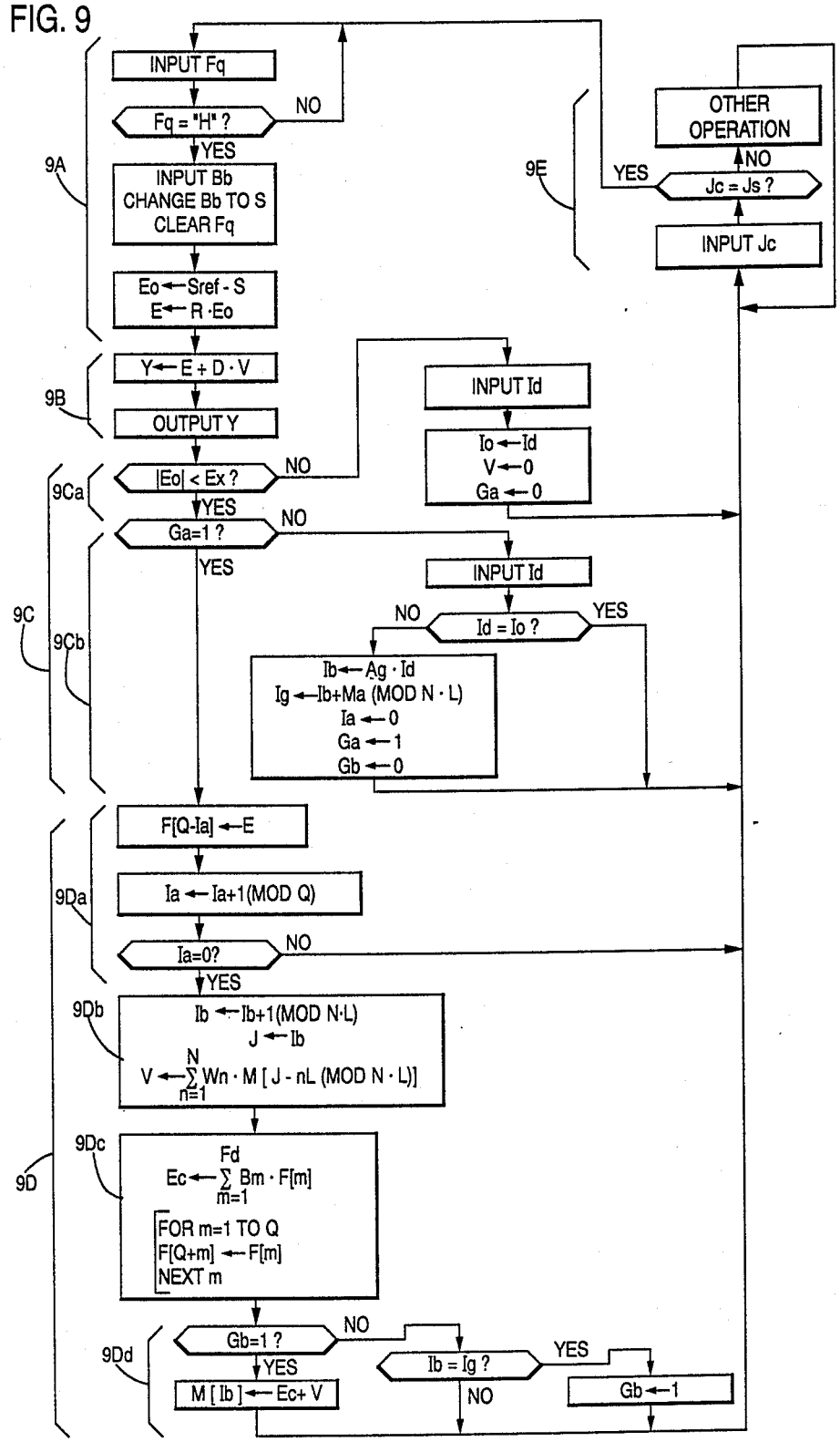
FIG. 9 is another flow diagram of the operation of the microprocessor which represents an embodiment of a control system according to the present invention with the combination of FIG. 7, FIG. 2, FIG. 3, and FIG. 9.

FIG. 9 shows another flow diagram of the operation of the microprocessor 13A in the controlling block 13, which represents another embodiment of the present invention as represented by the combination of FIG. 7, FIG. 2, FIG. 3, and FIG. 9. The flow diagram of FIG. 9 will be explained hereinbelow.

AN ERROR SIGNAL PRODUCING BLOCK 9A (9A-1) The flag signal Fq is checked until it becomes "H". That is, the microprocessor 13A is triggered so as to execute the following procedure at the timing when the speed detector 12B obtains a new detected code corresponding to the current speed of the brushless motor 11D.

(9A-2) The detected signal Bb, the held content of the counter 34, is inputted and changed to the digital or coded value S. Then, the contents of the counter 34 and the D-type flip-flop 35 are reset by generating the reset signal Rr "H" for a very short time.

(9A-3) A difference value Eo is computed between the detected value S and a predetermined value Sref corresponding to the target speed. That is, Eo=Sref−S. Then, an error signal E is obtained by multiplying the difference value Eo with a predetermined positive value R. That is, E=REo. A new value of the error signal E is detected at intervals of the detecting period equal to the period of the sensed signal Aa.

A CONTROL SIGNAL PRODUCING BLOCK 9B (9B-1) An output signal Y is obtained by mixing the error signal E with a composite value V produced in a composing block 9Db in a memorizing block 9D, described later, at a ratio of 1: D, where D is a positive real at most equal to 1.5 and at least equal to 0.25.

(9B-2) The output signal Y is outputted to the D/A converter 13C as the control signal Cs.

AN INITIAL POSITION DETECTING BLOCK 9C

The initial position detecting block 9C comprises an error checking block 9Ca and an initial position setting block 9Cb.

<AN ERROR CHECKING BLOCK 9Ca>

(9Ca-1) The absolute value of the difference value, |Eo|, is compared with a predetermined positive value Ex. When $|Eo| < Ex$, which means that the speed of the brushless motor 11D is substantially equal to the target speed, the operation of the microprocessor 13A goes to the initial position setting block 9Cb so as to obtain the stored position of the memorized value corresponding to the rotational position of the brushless motor 11D before the control operation using the memorizing block 9D is executed. When $|Eo| > Ex$ or $|Eo| = Ex$, which means that the speed of the brushless motor 11D is far from the target speed, the operation of the microprocessor 13A goes to (9Ca-2).

(9Ca-2) The position signal Id of the position detector 13F is inputted and stored in a register. The value of the position signal Id is also denoted as Id.

(9Ca-3) A variable Io is replaced by Id, the composite value V is replaced by 0, and a variable Ga is replaced by 0. That is, $Io=Id$, $V=0$, and $Ga=0$. Then, the operation of the microprocessor 13A goes to an operation selecting block 9E.

<AN INITIAL POSITION SETTING BLOCK 9Cb>

(9Cb-1) The variable Ga is compared with 1. When $Ga=1$, the operation of the microprocessor 13A goes to the memorizing block 9D. When $Ga<1$ or $Ga>1$, the operation of the microprocessor 13A goes to (9Cb-2).

(9Cb-2) The position signal Id of the position detector 13F is inputted and compared with the variable Io. When $Id=Io$, which means that the present value Id of the position signal is the same as the old value Io, the operation of the microprocessor 13A goes to the operation selecting block 9E. When $Id>Io$ or $Id<Io$, which means the present value Id of the position signal is changed from the old value Io, the operation of the microprocessor 13A goes to (9Cb-3).

(9Cb-3) A second count variable Ib is replaced by AgId ($Ib=AgId$), where Ag is a positive integer substantially equal to (Pa/Rg)/Q and Q is an integer at least equal to 2 and preferably a divisor of Pa/Rg. In this case, $Q=4$ and $Ag=(Pa/Rg)/Q=32$. A variable Ig is replaced by 'Ib+Ma (MOD NL)', where N and where L will be explained later and Ma is an integer at least equal to 2. The variable Ig proceeds the second count variable Ib by Ma. A first count variable Ia is replaced by 0 ($Ia=0$). The variable Ga is replaced by 1 ($Ga=1$), and a variable Ga is replaced by 0($Gb=0$). Then, the operation of the microprocessor 13A goes to the operation selecting block 9E.

A MEMORIZING BLOCK 9D

The memorizing block 9D comprises a selecting task block 9Da, the composing block 9Db, a filtered error signal producing block 9Dc and a renewing block 9Dd.

<A SELECTING TASK BLOCK 9Da>

(9Da-1) The error signal E at this timing is stored in a register F[Q-Ia]. That is, $F[Q-Ia]=E$.

(9Da-2) The first count variable Ia is incremented with a modulo number Q. That is, '$Ia=Ia+1(MOD Q)$' means '$Ia=Ia+1$ and $Ia=0$ if $Ia=Q$'. Thus, the first count variable Ia varies from 0 to Q-1 and increments the number in a circular form at every detecting timing of the speed detector 12B.

(9Da-3) The first count variable Ia is compared with 0. When $Ia=0$, the operation of the microprocessor 13A goes to the composing block 9Db so as to execute the composing block 9Db, the filtered error signal producing block 9Dc, and the renewing block 9Dd. When $Ia>0$ or $Ia<0$, that is, Ia is from 1 to Q-1, the operation of the microprocessor 13A goes to the operation selecting block 9E.

<A COMPOSING BLOCK 9Db>

(9Db-1) The second count variable Ib is incremented with a modulo number NL, where L is an integer at least equal to 2 and substantially equal to Pa/Q or an integral multiple of Pa/Q (preferably $L=Pa/Q$) and N is an positive integer including 1. That is, '$Ib=Ib+1$ (MOD NL)' means '$Ib=Ib+1$ and $Ib=0$ if $Ib=NL$'. Thus, the second count variable Ib varies from 0 to $NL-1$ and increments the number in a circular form at every Q detecting timings of the speed detector 12B. In this case, $L=Pa/Q=128$.

(9Db-2) Another integer J is replaced by Ib. That is, $J=Ib$.

(9Db-3) The composite value V is computed by combining linearly a set of N memorized values $M[J-nL$ (MOD NL)$]$ ($n=1, \ldots ,N$) with positive coefficients Wn ($n=1, \ldots ,N$) from $n=1$ to $n=N$, where the N memorized values $M[J-nL$ (MOD NL)$]$ ($n=1, \ldots ,N$) have been renewed at intervals of L renewing cycle periods. That is, the composite value V is computed by Eqs. (1), (2), (3), and (4).

<A FILTERED ERROR SIGNAL PRODUCING BLOCK 9Dc>

(9Dc-1) A filtered error signal Ec is computed by combining linearly a plurality of values F[m] ($m=1,2, \ldots ,Fd$) which are values of the error signal E sequentially with respect to the timings obtained, where Fd is a positive integer at least equal to 2 and at most equal to 2Q. That is, the filtered error signal Ec is computed by Eqs. (5), (6), and (7). After the computation of the filtered error signal Ec, the values F[m] ($m=1, 2, \ldots ,Q$) are transferred to the registers F[Q+m] ($m=1, 2, \ldots ,Q$), respectively. Notice that the values F[m] ($m=1, 2, \ldots ,2Q$) at the computing timing of the filtered signal Ec are those of the error signal E sequentially with respect to the timings obtained. Notice also that the filtered error signal producing block 9Dc with the relationships of Eq. (5) to Eq. (7) has a low-pass digital filter characteristics which has a gain substantially equal to 1 at a relatively lower frequency region including the DC region, and a reduced gain much smaller than 1 at a relatively higher frequency region.

<A RENEWING BLOCK 9Dd>

(9Dd-1) The variable Gb is compared with 1. When $Gb=1$, the operation of the microprocessor 13A goes to (9Dd-2) so as to renew the memorized value stored at the address corresponding to the second count variable Ib. When $Gb<1$ or $Gb>1$, the second count variable Ib is compared with Ig. When $Ib=Ig$, the variable Gb is replaced by 1 ($Gb=1$). Then, the operation of the microprocessor 13A goes to the operation selecting block 9E. When $Ib<Ig$ or $Ib>Ig$, the operation of the microprocessor 13A goes to the operation selecting block 9E. Notice that none of the memorized values is renewed when $Ib<Ig$ and $Ib=Ig$.

(9Dd-2) A memorized value M[Ib], stored at the address (the stored position) corresponding to the second count variable Ib in the RAM of the memory 13B, is renewed by a mixed value of the filtered error signal Ec and the composite value V at a ratio of 1:1. That is, $M[Ib]=Ec+V$. The renewed memorized value M[Ib] is held until the next renewing time of M[Ib]; that is, the NL renewing cycle periods later. As the result of this, the NL memorized values M[0] to M[NL−1] are obtained, and the NL memorized values are sequentially and periodically renewed at intervals of the renewing cycle period equal to Q times the detecting period. After the execution of the task of the renewing block 9Dd, the operation of the microprocessor 13A goes to the operation selecting block 9E.

AN OPERATION SELECTING BLOCK 9E (9E-1) The select signal Jc from the operation selector 13D is inputted and stored in a register. The value of the select signal Jc is also named as Jc.

(9E-2) Jc is compared with a predetermined value Js. When Jc=Js, which means that the control operation using the error signal producing block 9A, the control signal producing block 9B, the initial position detecting block 9C, and the memorizing block 9D is selected for controlling the speed of the brushless motor 11D, the operation of the microprocessor 13A returns to the error signal producing block 9A. When Jc>Js or Jc< Js, which means that another control operation not using the memorizing block 9D is selected, the operation of the microprocessor 13A goes to (9E-3).

(9E-3) The microprocessor 13A executes an operation corresponding to the select signal Jc. After the execution, the operation of the microprocessor 13A returns to (9E-1) for reselecting the operation.

The control system of the embodiment of the present invention as shown by the combination of FIG. 7, FIG. 2, FIG. 3, and FIG. 9 uses comparably a small size of RAM and has an excellent robustness to disturbances when the microprocessor 13A executes the control operation using the error signal producing block 9A, the control signal producing block 9B, and the memorizing block 9D, as explained in the previous U.S. application, Ser. No. 22,872 filed March 6, 1987.

Further, the control system of the embodiment of the present invention has a quick response in reaching a steady state of the excellent robustness to disturbances by providing the position detector 13F and the initial position detecting block 9C, which is explained in detail hereinbelow. The position detector 13F always detects the physical movement (the rotation) of the brushless motor 11D and obtains the position signal Id, the value of which always corresponds to the physical position (the rotational position) of the brushless motor 11D. When the selecting signal Jc is changed to Js, the brushless motor 11D begins to rotate and accelerate the speed to the target speed. Since the absolute value of the difference value |Eo| is larger than Ex during the starting or accelerating time, the error checking block 9Ca in the initial position detecting block 9C substitutes the variable Io with the position signal Id from the position detector 13F. When |Eo| becomes smaller than Ex, the initial position setting block 9Cb in the initial position detecting block 9C finds a rotational position where the position signal Id from the position detector 13F changes by comparing the position signal Id with the variable Io, and it replaces the count variables Ia and Ib with O and AgId corresponding to the new position signal Id, respectively. The second count variable Ib indicates the address (the stored position) of the memorized value M[Ib] in the memorizing block 9D. Since the length of the L renewing cycle periods is equal to the one revolution period or an integral multiple of the one revolution period of the brushless motor 11D, the stored position of the memorized value corresponding to the rotational position of the brushless motor 11D is obtained promptly and correctly as soon as |Eo| becomes smaller than Ex.

The memorizing block 9D can produce promptly and correctly the composite value V in the composing block 9Db by using the memorized value corresponding to the rotational position of the brushless motor 11D. The composite value V is used in the control signal producing block 9B to suppress the influence of the dominant torque disturbances generated by the brushless motor 11D and the load 11C. Thus, the control system of the embodiment of the present invention as represented by the combination of FIG. 7, FIG. 2, FIG. 3, and FIG. 9 has a quick response in reaching a steady state of the excellent robustness to disturbances once the control operation using the memorizing block 9D is executed.

Notice that since the count variables Ia and Ib are initially set with values corresponding to the rotational position of the brushless motor 11D by finding the timing at which the position signal Id (the content of the cyclic up-down counter 45) changes, the initial position setting block 9Cb can set the correct or accurate values of the count variables Ia and Ib which correspond to the rotational position of the brushless motor 11D, though the position detecting cycles/revolution of the position detector 13F, Rg, is much less than the speed detecting cycles/revolution of the speed detector 12B, Pa.

The response of the control system of the embodiment of the present invention as represented by the combination of FIG. 7, FIG. 2, FIG. 3, and FIG. 9 is further improved by using the composite value V corresponding to the memorized values before the renewing block 9Dd begins to renew the memorized values, which will be explained in detail hereinbelow. The initial position setting block 9Cb obtains the variable Ig proceeding the second count variable Ib by Ma when |Eo| becomes smaller than Ex. The composing block 9Db produces the composite value V from the memorized values, while the renewing block 9Dd does not renew the memorized values but holds them until the second count variable Ib becomes to proceed Ig by 1. Since the composite value V is used for producing the control signal Cs in the control signal producing block 9B, the fluctuation of the speed of the brushless motor 11D is reduced by the composite value V. Thus, the error signal E and the filtered error signal Ec are already reduced before the renewing block 9Dd begins to renew the memorized values. As the result of this, the control system of the embodiment of the present invention as represented by the combination of FIG. 7, FIG. 2, FIG. 3, and FIG. 9 reaches a steady state as soon as the renewing block 9Dd begins to renew the memorized values. Notice that the values in the registers F[m] (m=1, 2, ... ,2Q) for computing the filtered error signal Ec can be prepared before the renewing block 9Dd begins to renew the memorized values.

For comparing the responses, consider the control system that begins to renew the memorized values as soon as |Eo| becomes smaller than Ex, such as the control system of the embodiment of the present invention as represented by the combination of FIG. 1, FIG. 2, FIG. 3, and FIG. 6. The error signal E is comparably large a short time after |Eo| becomes smaller than Ex, because of the following reasons. The first reason is that Ex is large enough to cover the fluctuation of |Eo| in a steady state. The second reason is that a short response time is necessary for reducing to the error signal E by using the composite value V corresponding to the memorized values. The values in the registers F[m] (m=1, 2, ...,2Q) for computing the filtered error signal Ec are not prepared before the renewing block begins to renew the memorized values. Since the memorized value stored at the address corresponding to the second count variable Ib is renewed by a mixed value of the filtered error signal Ec and one or more of the memorized values, the memorized values renewed in the short time after |Eo| becomes smaller than Ex have comparably large values or irregular values, which are held until the next renewing timings, about L renewing cycle periods later. The composing block 9Db produces a comparably large composite value V by using the comparably large memorized values at the L renewing cycle periods later. Since the control signal Cs contains the comparably large composite value V, the speed of the brushless motor 11D is disturbed by the comparably large composite value V, and the error signal E becomes somewhat large. In this manner, the influence of the large error signal E in the short time after |Eo| becomes smaller than Ex remains in the memorized values for a considerably long time, if the memorized values are renewed as soon as |Eo| becomes smaller than Ex.

Specific embodiments of the present invention have been described hereinabove with reference to the accompanying drawings, but it should be understood that the invention is not limited to those specific embodiments, and that various changes and modifications may be effected therein by one skilled in the art without departing from the scope or spirit of the invention as defined in the appended claims. In particular, modifications described in the previous U.S. patent application, Ser. No. 917,498 filed October 10, 1986 and Ser. No. 22,872 filed March 6, 1987 should be included. Furthermore, the error signal can be a signal composed with a speed error and a phase error of a motor so as to control not only the speed but also the phase of the motor, when the control system for a motor has a phase detector as well as a speed detector.

What is claimed is:

1. A control system for controlling a brushless motor comprising:
 position sensing means for producing multiphase position sensor signals indicative of a rotational position of the brushless motor;
 sensing means for producing a sensed signal having a frequency indicative of a rotational speed of the brushless motor, wherein the frequency of said sensed signal is substantially higher than a frequency of the position sensor signals;
 speed detecting means for producing a detected signal of a digital number representative of the rotational speed of the brushless motor at intervals of a detecting cycle period proportional to a period of the sensed signal;
 error signal producing means for producing an error signal when the detected signal indicates that the rotational speed of the brushless motor deviates from a target rotational speed by more than a specified amount;
 a memory having stored therein a plurality of memorized values at a plurality of sequential storing positions corresponding to a plurality of sequential rotational positions of the brushless motor;
 cyclic up-down counter means for counting pulses of at least one of the multiphase position sensor signals according to a rotating direction of the brushless motor, wherein a count value is obtained corresponding to a rotational position of the brushless motor;
 initial position detection means for detecting a timing at which the count value of said counter means changes after an absolute value of the error signal becomes less than a predetermined value, and for detecting from the count value at the thus detected timing a storing position in said memory corresponding to a rotational position of the brushless motor;
 storing means for renewing, sequentially and periodically at intervals of a renewing cycle period proportional to the detecting cycle period of the speed detecting means, each of the plurality of memorized values in said memory by a first mixed value which is obtained by a means for mixing the error signal with at least one of the memorized values which are at least an interval of L renewing cycle periods older, where L is an integer at least equal to 2 and the interval of L renewing cycle periods is equal to the rotational period of the brushless motor, wherein said storing means determines a storing position from which the renewing is to be started from the storing position detected by said initial position detecting means;
 control signal producing means for producing a control signal from a second mixed value which is obtained by a means for mixing the error signal with at least one of the memorized values; and
 driving means responsive to the control signal for providing to the brushless motor multiphase currents proportional to the control signal.

2. A control system as claimed in claim 1, wherein L is equal to Ad times a maximum value of the count value of said cyclic up-down counter means, where Ad is an integer at least equal to 2.

3. A control system as claimed in claim 1, wherein said storing means includes:
 composing means for producing one or more composite values periodically at intervals of the renewing cycle period, each of the composite values being at least a linear combination of at least one of the memorized values having been renewed at intervals of the L renewing cycle periods;
 renewing means for renewing, sequentially and periodically at intervals of the renewing cycle period, the memorized values each by the first mixed value which is obtained by mixing the error signal with a composite value produced by said composing means.

4. A control system a claimed in claim 3, wherein said composing means computes periodically at least one linear combination of a set of N memorized values having been renewed at intervals of the L renewing cycle periods with coefficients having a same sign, where N is an integer at least equal to 2.

5. A control system as claimed in claim 1, wherein the renewing cycle period of said storing means is equal to Q times the detecting cycle period of said speed detecting means, where Q is an integer at least equal to 2.

6. A control system as claimed in claim 5, wherein said storing means includes:
 filtered error signal producing means having a low-pass filter characteristic for filtering the error signal to produce a filtered error signal;
 composing means for producing at least one composite values periodically at intervals of the renewing cycle period, each of the composite values being at least a linear combination of the at least one of the memorized values having been renewed at intervals of the L renewing cycle periods; and renewing means for renewing, sequentially and periodically at intervals of the renewing cycle period, the memorized values each by the first mixed value which is obtained by mixing the filtered error signal with a composite value produced by said composing means.

7. A control system as claimed in claim 6, wherein said filtered error signal producing means produces the filtered error signal by combining linearly a plurality of values of the error signal sequentially with respect to the timings obtained.

8. A control system as claimed in claim 6, wherein said composing means computes periodically at least one linear combination of a set of N memorized values having been renewed at intervals of the L renewing cycle periods with coefficients having a same sign, where N is an integer at least equal to 2.

* * * * *